V. ANDERSON.
COMBINED FRICTION CLUTCH AND PULLEY.
APPLICATION FILED DEC. 27, 1912.
1,187,596.
Patented June 20, 1916.
3 SHEETS—SHEET 1.
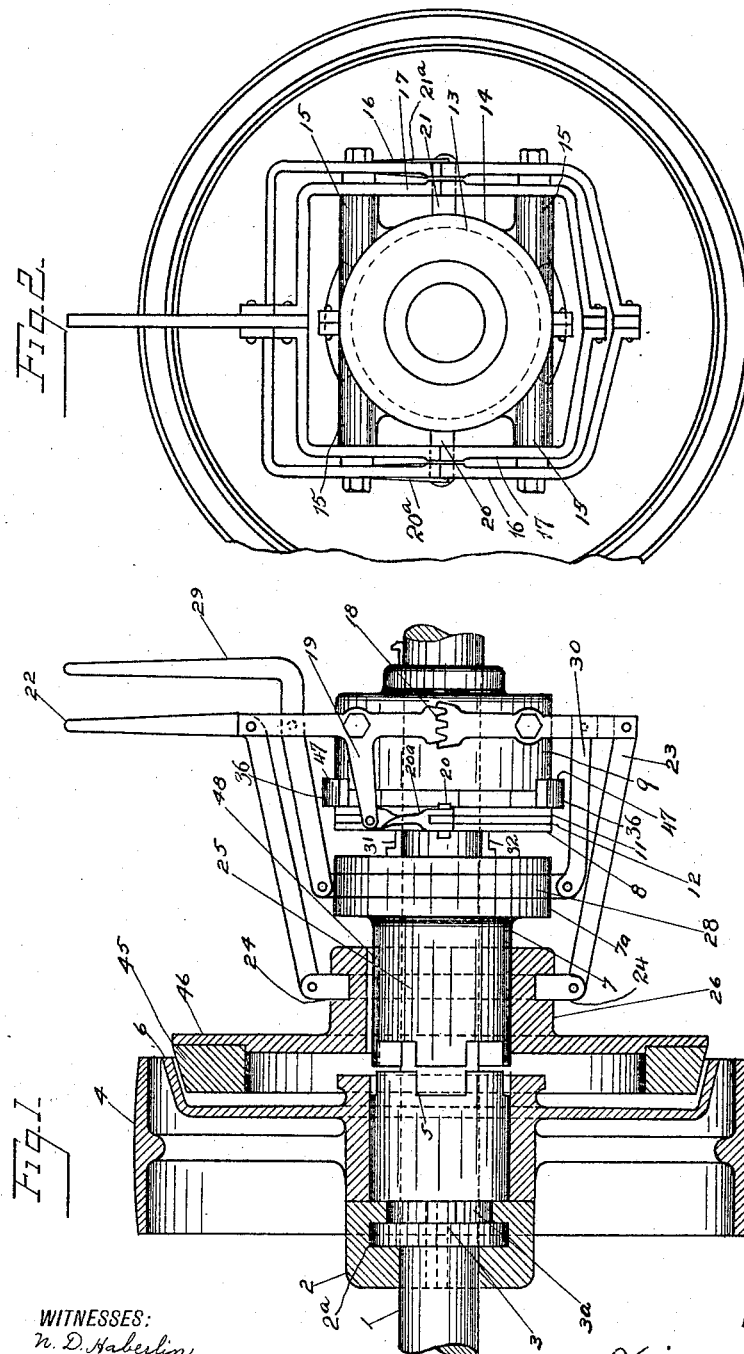
WITNESSES:
N. D. Haberlin
Valentine Brown Jr
INVENTOR
Vaino Anderson.
BY
Peter Haberlin
ATTORNEY

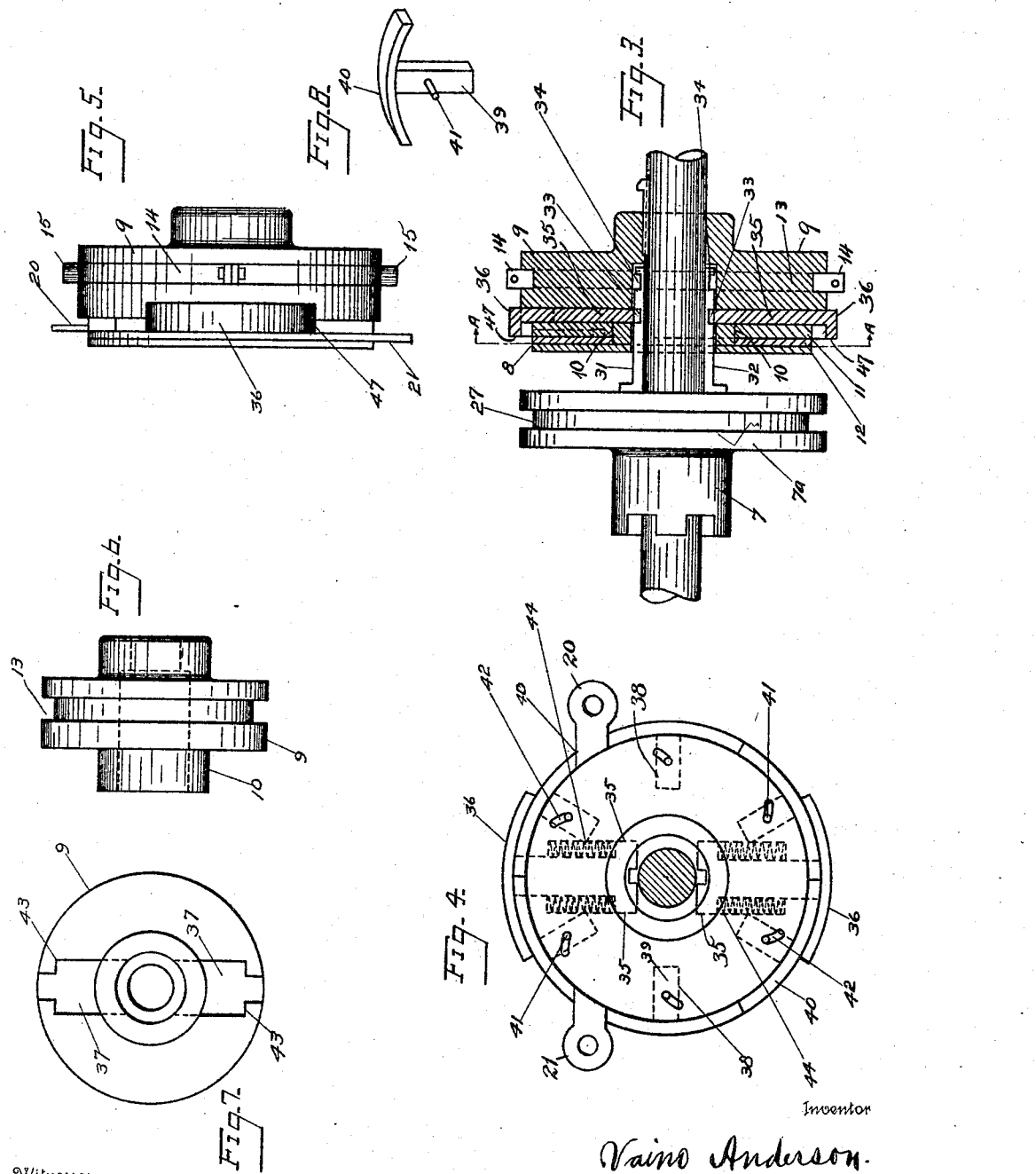

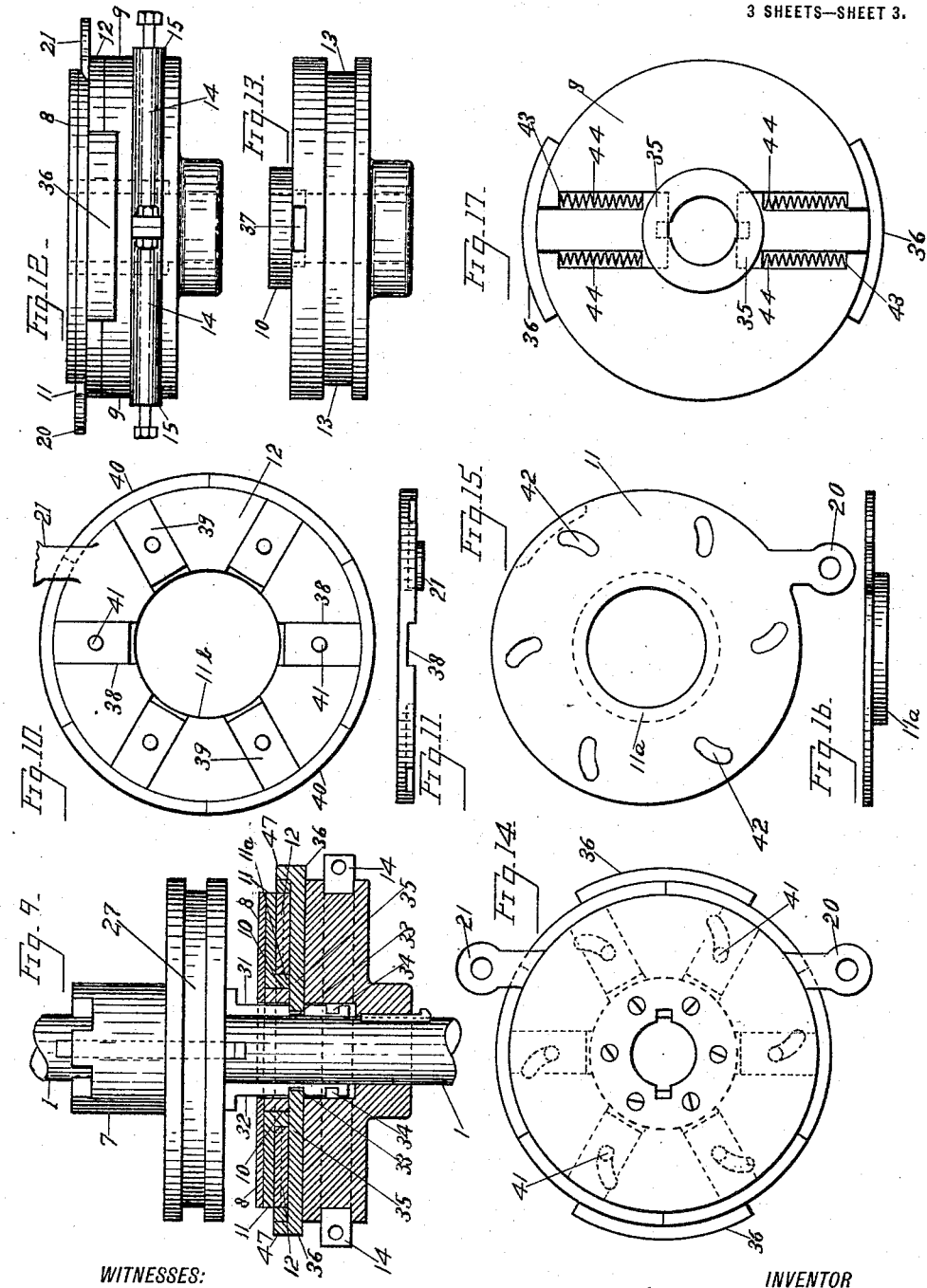

UNITED STATES PATENT OFFICE.

VAINO ANDERSON, OF PORTLAND, OREGON.

COMBINED FRICTION-CLUTCH AND PULLEY.

1,187,596.  Specification of Letters Patent.  Patented June 20, 1916.

Application filed December 27, 1912.  Serial No. 738,810.

*To all whom it may concern:*

Be it known that I, VAINO ANDERSON, a citizen of the United States, residing at Portland, in the county of Multnomah and State of Oregon, have invented certain new and useful Improvements in Combined Friction-Clutches and Pulleys, of which the following is a specification.

My invention relates to a combined friction-clutch and pulley adapted to fit driving-shafts in mills, factories and other plants where machinery for the transmission of power is in use.

The object of my invention is to provide a device of this kind that is simple in construction, efficient, and inexpensive in manufacture; but more particularly to eliminate the use of a tight and loose pulley.

The invention consists of certain novel features, combinations, and arrangements of parts as will be hereinafter described and specifically claimed.

Other objects and advantages of my invention will be made clearly apparent in the following specification, taken in connection with the accompanying drawings which form part of this application, in which:—

Figure 1 is a longitudinal section of the pulley and clutch with the levers and locking-mechanisms in elevation; Fig. 2, is an end elevation of same; Fig. 3 is an end elevation of clutch-jaw 7, and a section through collar 9, cam 11, and plate 12; Fig. 4 is an end elevation taken on line A A of Fig. 3; Fig. 5 is an elevation of the sectional portion of Fig. 3; Fig. 6 is a side elevation of collar 9; Fig. 7 is an end elevation of same, and Fig. 8 is a perspective of one of the shoes 40; Fig. 9 is a section similar to Fig. 3 showing feet 35 in engagement with slots 33; Fig. 10 is a plan of plate 12, with segments 40 attached thereto; Fig. 11 is an elevation of the same; Fig. 12 is a view similar to Fig. 5, with members 14 more clearly shown; Fig. 13 is a similar view of same with the detachable members removed; Fig. 14 shows an elevation of cam 11 and plate 12 assembled; Fig. 15 is a plan of cam 11; Fig. 16 is an elevation of same, and Fig. 17 is a plan of collar 9 showing segments 36 placed therein.

In the practice of my invention I employ a shaft 1, on which is fixed a split collar 2, with an annular groove 2ª therein, said groove being of the requisite dimensions to receive flange 3 of sleeve 3ª, to prevent pulley 4 from longitudinal motion; integral with said pulley 4, are a clutch member 5, and friction-ring 6; mounted also on shaft 1, are member 7, disk 8, and collar 9; integral with said magazine is a bearing 10, on which is revolubly mounted cam 11. By observing Figs. 15 and 16 it will be noted that cam 11 has attached thereto a boss 11ª, on which is mounted plate 12 by means of aperture 11ᵇ, as best shown in Fig. 9.

Magazine 9 has an annular groove 13, therein, into which is placed a split ring 14, with bosses 15, integral therewith; pivoted to said bosses are outer yokes 16 and inner yokes 17 respectively. In Fig. 1 it will be seen that yokes 16 have gear-teeth 18 and arms 19 integral therewith; one of said arms being attached to lug 20 of cam 11 by means of lever 20ª, while the opposite arm is attached to lug 21 of plate 12 by means of lever 21ª; pivotally attached to yokes 16 are friction-levers 22 and 23 respectively; said friction-levers being also pivoted to split ring 24, which fits into annular groove 25 of collar 26.

Flange 7ª, of member 7 has an annular groove 27 therein, to receive split ring 28, to which are pivoted one end of locking-levers 29 and 30 respectively. Firmly fixed to said flange are keys 31 and 32 with transverse slots 33 and 34 therein; said slots being adapted to receive feet 35 of segments 36, which fit into slots 37 of collar 9; said feet serving as means to lock friction-collar 45 against longitudinal movement.

By referring to Fig. 10 it will be seen that plate 12 has a plurality of slots 38 therein, to receive bars 39 of shoes 40; attached to said bars are pins 41, which extend outwardly from said bars and register with apertures 42 of cam 11. Resting on said feet 35 and pressing outwardly against shoulders 43, of slots 37 (best shown in Fig. 17), are helical springs 44, which hold said feet into slots 33, when the clutch-members are normal, and into slots 34, when said clutch-members are engaged; said springs also prevent feet 35, from leaving said slots by centrifugal force when collar 9 is rotating.

In order to operate my invention, lever 22 is moved toward pulley 4, which action engages friction-ring 6, with friction-collar 45 which is attached to flange 46, of collar 26. Actuating said lever 22 toward pulley 4, also lifts shoes 40 outward; when said shoes are moved outwardly, parts of the periphery of four of said shoes come in contact with lips 47 of segments 36, and press said segments outward, which movement disengages feet 35 of said segments from slots 33. The distance of outward travel of said shoes and segments is governed by the movement of pins 41 in apertures 42 of cam 11. When lever 22 is actuated as above described, the operator then moves lever 29 horizontally in order to engage member 7 of the clutch, with member 5. Member 7 has affixed thereto a key 48, which extends into a slot in collar 26, said key serving as a means to hold the points of engagement of said members in alinement. When the members of clutch are engaged, the operator releases friction-lever 22, and springs 44 press feet 35 downward, so that said feet engage slots 34, which prevents accidental release of the members. To unlock the members, and disengage the friction-ring and friction-collar, the above described operations are reversed.

My invention may be constructed of any material and made of any size deemed suitable for such a mechanism, and while I have described and illustrated a preferred form of construction and combination of elements deemed suitable for such a device, I desire to include in this application all mechanical equivalents and substitutes that may be fairly considered to come within the scope of my invention as defined and specified in the appended claims.

Having thus fully described my invention so that others skilled in the art to which it appertains, may be enabled to construct and use the same, what I claim and desire to secure by Letters Patent, is:—

1. A combination friction and interlocking clutch comprising in combination with a shaft, a pulley having a friction clutch portion and an interlocking clutch portion, mounted loosely on said shaft, a friction clutch member keyed to turn with said shaft and movable into and out of holding engagement with the friction clutch portion of said pulley, an interlocking clutch member keyed to turn with said shaft and movable into and out of interlocking engagement with the interlocking clutch portion of said pulley, means for locking said interlocking clutch member in its operative position longitudinally of said shaft, and means for moving said friction clutch member and said interlocking clutch member independently of each other into and out of operating engagement with said pulley.

2. A combination friction and interlocking clutch comprising in combination with a shaft, a pulley having a friction clutch portion and an interlocking clutch portion, mounted loosely on said shaft, a friction clutch member keyed to turn with said shaft and movable into and out of holding engagement with the friction clutch portion of said pulley, an interlocking clutch member keyed to turn with said shaft and movable into and out of interlocking engagement with the interlocking clutch portion of said pulley, means for locking said interlocking clutch member in its operative position longitudinally of said shaft, means for moving said friction clutch member and said interlocking clutch member independently of each other into and out of operating engagement with said pulley, and operative connections from said means for unlocking said interlocking clutch member to permit of its being moved, substantially as described.

3. A combination friction and interlocking clutch comprising in combination with a shaft, a pulley having a friction clutch portion and an interlocking clutch portion, mounted loosely on said shaft, a friction clutch member keyed to turn with said shaft and movable into and out of holding engagement with the friction clutch portion of said pulley, an interlocking clutch member keyed to turn with said shaft and movable into and out of interlocking engagement with the interlocking clutch portion of said pulley, means for locking said interlocking clutch member in operative and inoperative positions longitudinally of said shaft, and operating levers pivotally mounted and connected, respectively, with said friction clutch member and said interlocking clutch member, and operative connections from the lever for operating said friction clutch member for locking and unlocking said interlocking clutch member, substantially as described.

In testimony that I claim the foregoing as my own, I hereunto affix my signature in the presence of two subscribing witnesses.

VAINO ANDERSON.

Witnesses:
C. S. GOLDBERG,
JOHN J. REKAR.

Copies of this patent may be obtained for five cents each, by addressing the "Commissioner of Patents, Washington, D. C."